United States Patent [19]
Hura

[11] 3,891,854
[45] June 24, 1975

[54] METHOD AND APPARATUS FOR UNLOADING CASSETTES

[75] Inventor: Michael Hura, Wickliffe, Ohio

[73] Assignee: Picker Corporation, Cleveland, Ohio

[22] Filed: Dec. 4, 1969

[21] Appl. No.: 882,084

[52] U.S. Cl. ..................... 250/468; 214/304; 95/94
[51] Int. Cl. ........................................... G01n 23/04
[58] Field of Search.................. 214/304, 307, 318; 250/468, 66; 95/94

[56] References Cited
UNITED STATES PATENTS
3,075,080  1/1963  Sano................................... 250/66

Primary Examiner—Robert J. Spar
Assistant Examiner—J. Mannix
Attorney, Agent, or Firm—Watts, Hoffman, Fisher & Heinke Co.

[57] ABSTRACT

A cassette unloader for opening an X-ray film cassette in an illuminated environment. Cassette retainer release means disposed within a light-tight housing releases the cassette retainers upon insertion of a cassette into the housing. Cassette opening means opens the cassette and releases the film sheet contained therein after the housing is rendered light-tight. The opening means permits a back plate of the cassette to swing open and the lead edge of the film sheet to drop, while a portion near the trailing edge is pinched to retain it in the cassette, thereafter to release the pinch on the trailing portion. A disabling means prevents opening of the cassette while the housing cover is open. An enabling means permits opening of the cassette when the cover is closed. A lost motion linkage elevates first the leading and thereafter the trailing edge of the cassette to facilitate film unloading.

16 Claims, 11 Drawing Figures

INVENTOR.
MICHAEL HURA
BY Watts, Hoffmann,
Fisher & Heinke
ATTORNEYS.

INVENTOR.
MICHAEL HURA
BY Watts, Hoffmann,
Fisher & Heinke
ATTORNEYS

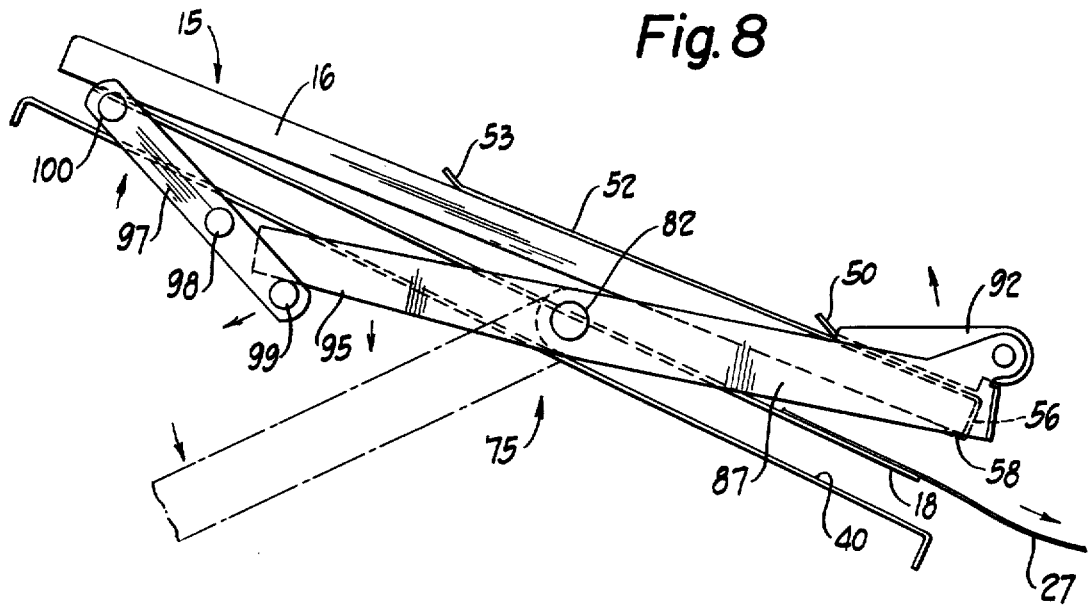
Fig. 8
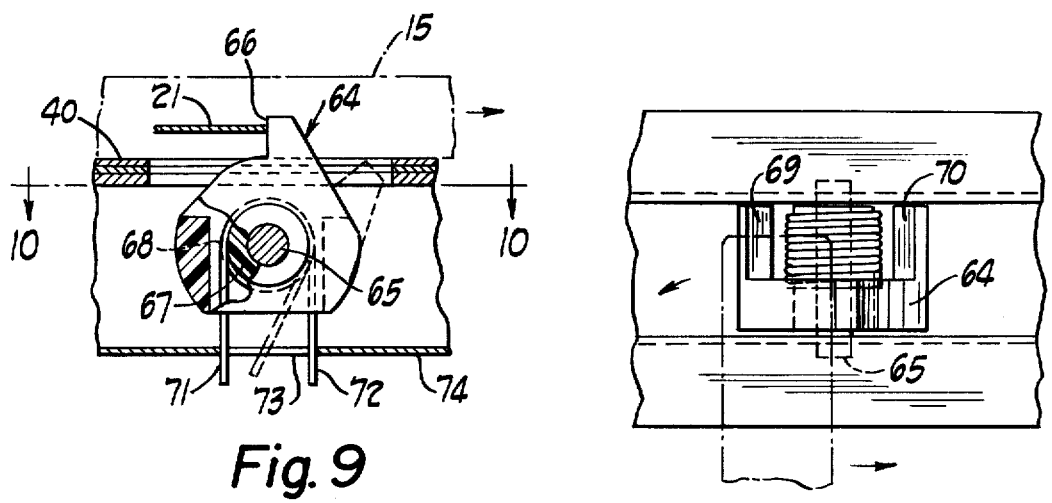
Fig. 9
Fig. 10
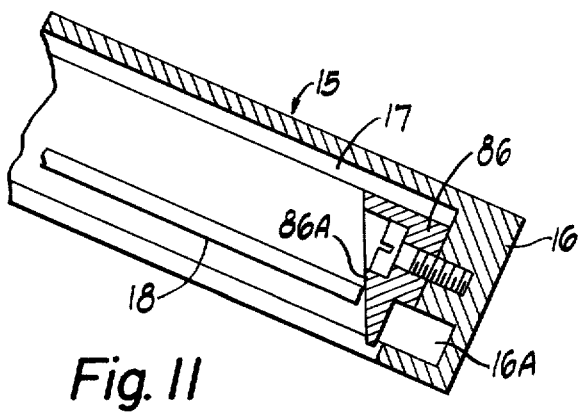
Fig. 11

METHOD AND APPARATUS FOR UNLOADING CASSETTES

CROSS REFERENCE TO RELATED PATENT AND APPLICATION

1. U.S. Pat. No. 3,418,913, issued Dec. 31, 1968 to J. L. Snarr, entitled "Film Processor".

2. Concurrently filed application Ser. No. 882,131, filed Dec. 4, 1969 now abandoned of J. L. Snarr entitled "Cassette Unloader".

BACKGROUND OF THE INVENTION

1. Field of the Invention

This invention pertains to X-ray film processing and more particularly to a mechanism for removing X-ray film from a cassette for direct feed into a film processor. Specifically, the invention relates to a so-called daylight unloader. A daylight unloader is a mechanism for removing exposed sheets of radiographic film from cassettes while the mechanism is exposed to ambient light.

In medical X-ray diagnosis, it is desirable in many instances to be able to process a radiograph while the patient is still in the X-ray room. If a radiograph is so processed, a radiologist can determine if the radiograph is deficient in any respect due to such things as patient movement or improper exposure. If a radiograph is not adequate for diagnostic purposes, another can be made at that time.

An example of a condition which demonstrates the importance of immediate availability of processed films is when a catheter has been inserted into blood vessels of the patient's body. In that circumstance, it is dangerous to leave the catheter in the patient's body for too long a period of time. With certain procedures and conditions it may be even more dangerous to reinsert the catheter too short a period of time after it has been removed. If a defective radiograph is not discovered before the catheter has been, or must be, removed, obviously the physician must wait until it is reinserted before the procedure can be repeated. Because of the importance of speed in processing radiographs, it is desirable to have a processor available in the X-ray room. For this purpose, it is important to have a mechanism which can remove the film from the cassette and feed it to the processor without darkening the room. Such a mechanism also has great utility in the so-called darkroom so that it is not necessary to darken the room each time one wishes to supply film to a processor.

2. Description of the Prior Art.

In the past, there have been proposals for so-called daylight cassette unloaders. These proposals suggested darkened chambers into which a loaded cassette would be inserted. The cassette would then be mechanically opened in the chamber and the film removed.

Some of these proposals have suggested the use of mechanical fingers which grasp the film and remove it from the cassette. These present problems of possible misregistration of the film in the fingers so that either it is not picked up or the film is grasped other than at the edge, resulting in marring of the film in an area that is important to the diagnosis to be performed. Moreover, if mechanical fingers are to be utilized, either the daylight unloader is limited to a single size of cassette or some complicated sensing mechanism must be provided to register the cassette with respect to the fingers and/or to adjust the fingers to an appropriate spacing for the width of film.

Others have proposed the use of suction cups which would be mounted on mechanical linkages to lift the film and then withdraw it from a cassette. Some proposals would utilize specialized cassettes. All such prior proposals are susceptible to jamming and are unduly complex and expensive.

Moreover, most prior proposals have not been for devices which lend themselves to use in an X-ray room. These proposals have been relatively complex and designed for high volume automatic use which is not required in that a simple, manually-fed and operated cassette unloader will supply film to a processor as frequently as is required in many circumstances.

SUMMARY OF THE PRESENT INVENTION

With the present invention, a simple cassette unloader is provided for conventional cassettes. The spring retainers which normally maintain the cassette in a closed condition are released when the cassette is inserted into the unloader. While the spring retainers are released, the unloading mechanism maintains the cassette closed. A cover is then closed so that the cassette is then in a darkened space. A simple lever arrangement is then actuated to release the film and allow it to be gravity fed from the cassette into the film processor.

After the cover has been lowered, the lever arrangement is actuated to elevate the forward end of the frame first. A typical cassette has a cover plate which is hinged to the cassette frame. These hinges are remote from the forward edge of the cassette. As the forward end of the unloader frame is elevated, the cover plate drops open. Since the rearward edge of the cassette is not initially elevated, hinges are spatially confined as the cover drops open. In accordance with the present invention, this hinge confinement causes the film to be pinched by the cover in a region near the hinges.

The pinching prevents the film from sliding downwardly, forwardly within the cassette. Thus, the pinching allows the forward edge of the film to drop free of the surrounding frame, while the trailing edge is retained in place. Subsequently, the trailing edge of the cassette is raised so that the pinched area is released and the film slides, under the force of gravity, out of the cassette and into processor feed rolls.

Other objects and a fuller understanding of the invention may be had by referring to the following description and claims taken in conjunction with the accompanying drawings.

BRIEF DESCRIPTION OF THE DRAWINGS

FIGS. 6-8 are somewhat schematic sectional views showing the sequence of operation of the cassette-unloading mechanism and on a scale reduced with respect to FIGS. 3-5;

FIG. 9 is an enlarged sectional view of one of the spring-release pawls of the invention as seen from the plane indicated by the line 9—9 of FIG. 4;

FIG. 10 is a sectional view of the spring-release pawl as seen from the plane indicated by the line 10—10 of FIG. 9; and, FIG. 11 is an enlarged, fragmentary sectional view of a portion of a cassette.

DESCRIPTION OF THE PREFERRED EMBODIMENTS

CASSETTE 15

Figure 1:
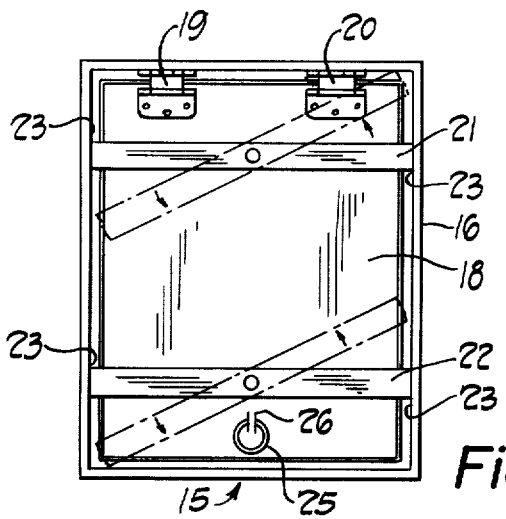
FIG. 1 is a bottom plan view of an X-ray film cassette.
Figure 2:
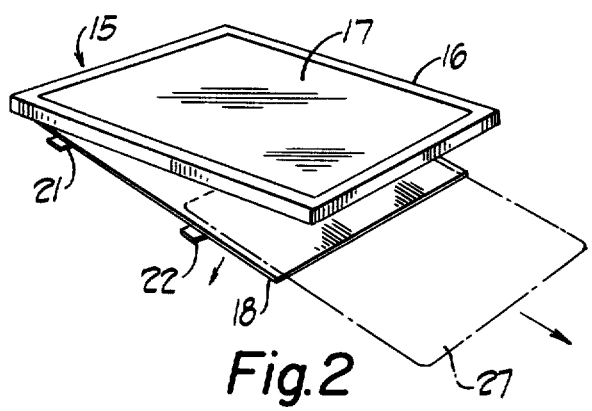
FIG. 2 is a perspective view of the cassette of FIG. 1 on a slightly-reduced scale and showing the cover swung open with a piece of film partially removed from the cassette.

Referring now to the drawings and to FIGS. 1 and 2 in particular, a cassette is shown generally at 15. With the exception of a modification shown in FIG. 11 which will be described presently, the cassette 15 is of conventional construction. The cassette 15 includes the usual rectangular frame assembly 16 which typically is fabricated from stainless steel.

A face plate 17 is carried by the frame 16. The face plate 17 is formed of Bakelite or similar material to provide opacity to light while providing transparency to X-radiation. A back plate, 18, FIG. 1, is connected to the frame 16 by a pair of hinges 19, 20. The back plate 18 is typically made of stainless steel and is, during a radiographic exposure, oriented away from the source of the X-radiation.

A pair of spring cassette retainers 21, 22 are pivotally connected to the back plate 18. The spring retainers are, when the cassette is closed, in the position shown in solid line in FIG. 1. In the closed position, the spring retainers abut stops 23 carried by the frame 16 and tip portions of the springs 21, 22 are under overlapping edges of the frame 16. Thus, the spring retainers 21, 22 bias the back plate 18 toward the face plate 17. The spring retainers 21, 22 cause the plates 17, 18 to compress a sandwich of film and two intensifying screens normally carried within the cassette. This provides intimate surface contact between the intensifying screens and the film.

When the cassette is opened, the spring retainers 21, 22 are rotated from the solid line position of FIG. 1 to the phantom position. This releases the engagement of the spring retainers 21, 22 with the frame 16, allowing the back plate 18 to be opened. A ring 25 is carried by a suitable bracket 26 connected to the back plate 18.

In conventional practice, a cassette containing an exposed film 27 is taken to a darkroom. An operator shifts the spring retainers 21, 22 from the solid line to the phantom position of FIG. 1. The operator then grasps the eye 25 to swing the back plate 18 about the pintles of the hinges 19, 20 and open the cassette. The exposed sheet of film 27 is then manually removed and placed in a processor.

THE CASSETTE UNLOADER — IN GENERAL

With the present invention, an arrangement is provided for the automatic unloading of the cassette in a darkened enclosure but within a room which need not be darkened. In addition, the film is fed from the cassette, once opened, automatically and directly into a film processor. The processor may be of the type described in the above-referenced patent.

Figure 3:
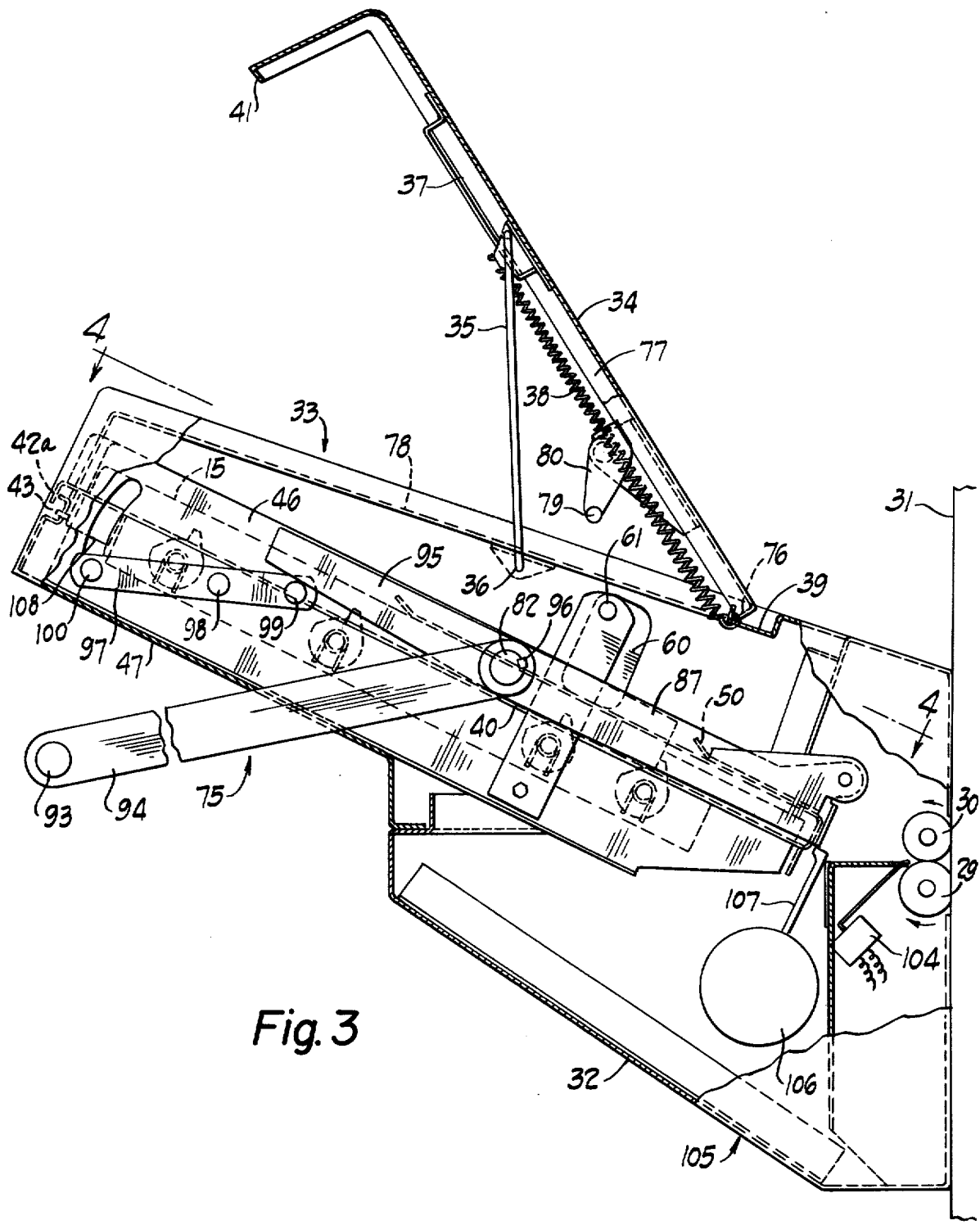
FIG. 3 is a side elevational view, with parts broken away and removed, of the cassette-unloading mechanism of this invention on a scale enlarged with respect to FIGS. 1 and 2.

Referring now to FIG. 3, inlet feed rolls 29, 30 are shown. These are the inlet feed rolls of the film processor. A fragmentary showing of a portion of the processor frame is identified by the reference numeral 31.

UNLOADER FRAME AND HOUSING 32

A cassette unloader frame and housing 32 is secured to the processor housing 31. The cassette unloader housing has imperforate walls except for a load opening indicated at 33. A cover 34 is movably mounted on the housing 32 to close the load opening 33 when the device is in use to render the load opening light tight.

The cover 34 is shown in an open position in FIG. 3. A support rod 35 is provided. The rod is generally of the shape of a square U. The ends of the rod are pivotally mounted in the housing 32 at spaced pivots 36, FIGS. 3 and 7. The support rod 35 slidably engages a guide track 37 in the cover. A spring 38 extends from the rod 35 to a pivot channel 39. The pivot channel 39 forms part of the frame and housing 32. The spring biases the rod in a clockwise direction, as viewed in the drawings, to open the cover and maintain it in the elevated position of FIG. 3.

A cassette support surface in the form of a tray 40 is connected to and forms a part of the unloader frame housing 32. The cassette support tray 40 slopes downwardly from the left to the right as viewed in FIGS. 5-8, at an angle of about 25° with the horizontal.

The cover 34 is pivotal from the open position of FIG. 3 in a counterclockwise direction against the action of the spring 38. The operator pulls the cover to the left, as viewed in the drawings, with a handle not shown. This permits a cover retaining lip 41 to clear the support tray 40. When the operator releases the cover, the spring biases the cover to the right so that the cover lip 41 is moved into a recess 42. The support tray has a downwardly-extending, cover-locking flange 42a at the left or load end. This flange 42a defines the top of the recess 42. The flange 42a coacts with the lip 41 to retain the cover 34 in the closed position of FIG. 6.

The cassette support tray 40 has upturned side flanges 43, 44. The side flanges 43, 44 extend longitudinally substantially the full length of the cassette support tray 40. A pair of vertically extending support flanges 45, 46 are mounted on the base 47 of the housing 32. The vertical support flanges 45, 46 are secured to and support the side flanges 43, 44 of the cassette support tray 40.

CASSETTE HOLDING FRAME 48

Figure 4:
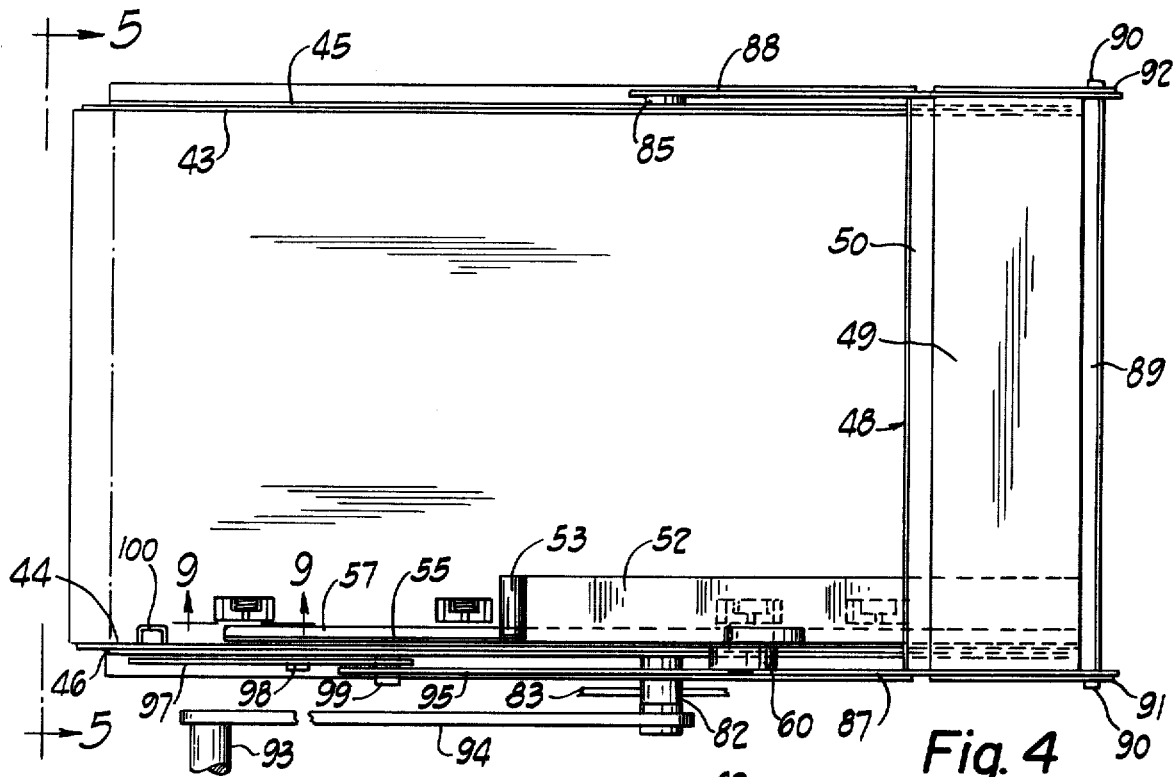
FIG. 4 is a plan view of the cassette-unloading mechanism as seen approximately from the plane indicated by the line 4—4 of FIG. 3 but with the housing removed for clarity of illustration and on the scale of FIG. 3.

A generally L-shaped cassette-holding frame is shown generally at 48, FIG. 4. The cassette-holding assembly 48 is positioned above the support tray 40. The cassette-holding assembly 48 includes a transversely-extending lip which includes a cassette end hold-down plate 49. The end hold-down plate 49 extends transversely across the support tray 40, extending past the vertical support flanges 45, 46. The end hold-down plate 49 includes a slanted guide lip 50. The guide lip 50 serves to cam a forward edge of a cassette under the end hold-down plate 49 when it is inserted into the assembly.

The cassette-holding assembly 48 also has a longitudinally extending leg including a cassette-side hold-down plate 52. The side hold-down plate 52 is on the right side, as viewed in FIG. 5, and the lower side as viewed in FIG. 4. The side hold-down plate overlies a side portion of the cassette frame 16 when the cassette is inserted in the unloader. The side hold-down plate 52 includes a lip 53 for camming the cassette frame under the plate 52 on insertion of the cassette.

Figure 5:
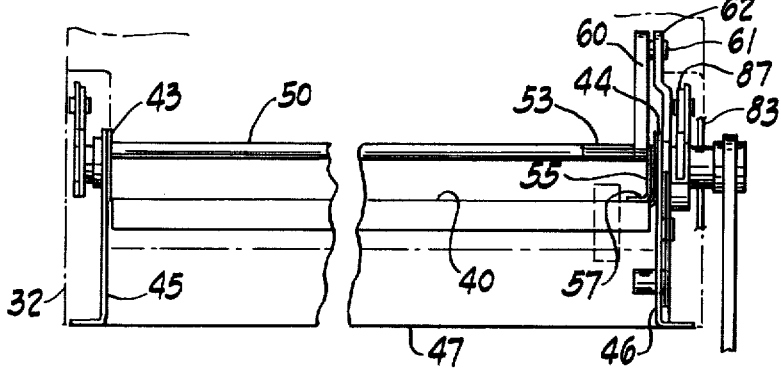
FIG. 5 is an end elevational view of the cassette-unloading mechanism, in foreshortened form, as seen from the plane indicated by the line 5—5 of FIG. 4 and on the scale of FIGS. 3 and 4.

The cassette-holding assembly includes a vertically extending side-engaging portion 55 which extends downwardly from the side hold-down plate 52, FIG 5. The holding assembly also includes a vertically extending forward-edge-engaging plate 56, FIG. 8, which extends downwardly from the end hold-down plate 49.

A cassette-side, frame-engaging and elevating lip 57 extends inwardly from the side-engaging plate 55, FIG. 5. A forward end edge frame-engaging lip 58 extends inwardly and rearwardly from the end engaging plate 56, FIG. 8. These frame engaging lips 57, 58 abut the cassette-supporting tray 40 when the cassette-holding assembly 48 is in the position shown in FIGS. 3, 4, and 5. When the cassette-holding assembly is elevated to the positions shown in FIGS. 7 and 8, the lips 57, 58 elevate the cassette frame 16 in a manner which will be described.

When the cover 34 is open and the mechanism is in position for receiving a cassette, the cassette holding assembly 48 is locked against the cassette supporting tray 40 by a pivotal assembly holding latch 60, FIGS. 3 and 5. The pivotal connection of the assembly latch 60 is provided by a pivot pin 61 which is rotatably mounted in a latch supporting vertical 62 extending upwardly from the vertical support flange 46, FIG. 5.

As is best seen in FIG. 4, the side frame engaging lip 57 and the vertical engaging plate 55 both extend rearwardly, to the left in the drawings, past the longitudinal hold-down plate 52 and the guide lip 53.

When a cassette is inserted in the opening mechanism, a side edge of the cassette frame 16 is positioned on top of the lip 57 and against the vertical side plate 55. The cassette is then slid forwardly and the frame is cammed by the lip 53 under the side plate 52. As the insertion of the cassette is continued, it is maintained in close association with the support plate 40 and the forward edge of the cassette frame is passed under the end hold-down plate 49. The cassette continues its forward movement until the forward frame edge is over the end frame-engaging lip 58 and against the vertical end-engaging plate 56.

DETENTS 64

When the cassette is inserted into the holding assembly 48, a plurality of detents 64 engage the spring clips 21, 22 and shift them from the solid line positions to the phantom positions of FIG. 1.

Each detent 64 is pivotally mounted on a detent support shaft 65, FIGS. 9 and 10. Each detent 64 includes a central sleeve portion 67 about which a coil spring 68 is disposed. Each sleeve portion 67 telescopes over its support shaft 65 to journal the detent.

Each detent 64 also includes inwardly-extending spring-engaging projections 69, 70. These projections are adapted to engage downwardly-extending spring end portions 71, 72. The spring end portions are normally maintained in the position shown in solid lines in FIG. 9. The walls of a spring slot 73 in a spring retainer 74, maintain the spring end portions 71, 72 in this normal position, thus maintaining the spring 68 under compression.

When the detent 64 rotates clockwise to the phantom position as shown in FIG. 9, the projection 70 acts against the spring end portion 72. Thus, for example, when the cassette frame passes over the pawl 66 of the detent 64 as shown in FIG. 9, the detent 64 will shift to the phantom position and then return to the solid-line position as soon as the cassette frame has passed. Conversely, on removal of a cassette, the detent can rotate in a counterclockwise position against the action of the spring end portion 71. The spring 68 is of sufficient strength that when the pawl 66 engages one of the cassette retainers 21, 22, the retainer will be disengaged from the frame without rotating the pawl out of its retainer-engaging position.

HOLDING ASSEMBLY LIFT MECHANISM 75

A holding assembly lift mechanism is shown generally at 75. The holding assembly 48 and the lift mechanism 75 together form a cassette manipulating assembly. After a cassette 15 has been fully inserted in the cassette holding assembly 48, and the cover 34 closed, the lift mechanism 75 is operated to elevate the holding assembly and release the film 27.

The holding latch 60 serves to disable the lift mechanism 75 until the cover is closed and the unloader frame and housing 32 is made light tight. Thus, prior to actuation of the holding assembly lift mechanism 75, it is necessary to release assembly latch 60. This release is automatically accomplished, as will be described, when the cover 34 is lowered. Lowering of the cover seals off ambient light. This light seal is accomplished by coaction of cover pivot lip 76 and the pivot channel 39, the cover lip and the locking flange 42a and cover side flange 77 and side channel 78. Suitable felt or other gaskets, not shown, are supplied to quiet the cover closing and perfect the light seal.

A latch release pin 79 is connected to the cover 34 by a pin support 80. As the cover 34 is lowered, the latch release pin 79 engages the left-hand, as viewed in FIGS. 3 and 6, side of the holding latch 60. This causes the holding latch 60 to rotate counterclockwise about its supporting pin 61 from its hold-down position shown in FIG. 3 to a release position shown in FIG. 6. Once the assembly latch 60 has been shifted to its release position of FIG. 6, the holding assembly lift mechanism 75 is enabled and one can actuate it to release the film 27 from its cassette 15.

A lift mechanism control pivot 82 is provided, FIGS. 4 and 5. The pivot 82 is journaled in a side wall 83 of the unloader housing and frame 32. The lift mechanism control pivot 82 is also journaled in the side flange 44 of the cassette supporting tray 40. A follower pivot 85 is journaled in the other side flange 43 of the cassette supporting tray 40, FIG. 4. Control and follower arms 87, 88 are fixedly connected to the control and follower pivots 82, 85 respectively.

A coordinating and pivot rod 89 connects the arms 87, 88 together. The rod 89 is connected to the cassette holding assembly 48 at spaced connecting pivots 90. The pivots 90 are defined by apertures in upstanding flanges 91, 92 of the holding assembly 48. The flanges 91, 92 are outboard of the arms 87, 88, FIG. 4.

A control handle 93 is provided, FIGS. 3 and 4. Control handle 93 is connected by a handle arm 94 to the control pivot 82. The handle arm 94 is keyed at 96 to the control pivot 82 so that actuation of the handle causes rotation of the control pivot 82.

As the handle 93 is depressed, the control and follower arms 87, 88 and the control and follower arm pivots 82, 85 will rotate counterclockwise as viewed in FIGS. 2 and 8. The initial counterclockwise rotation causes the forward or right-hand portion of the hold-down assembly to be elevated by the pivot rod 89 to the position shown in FIG. 7.

Figure 7:
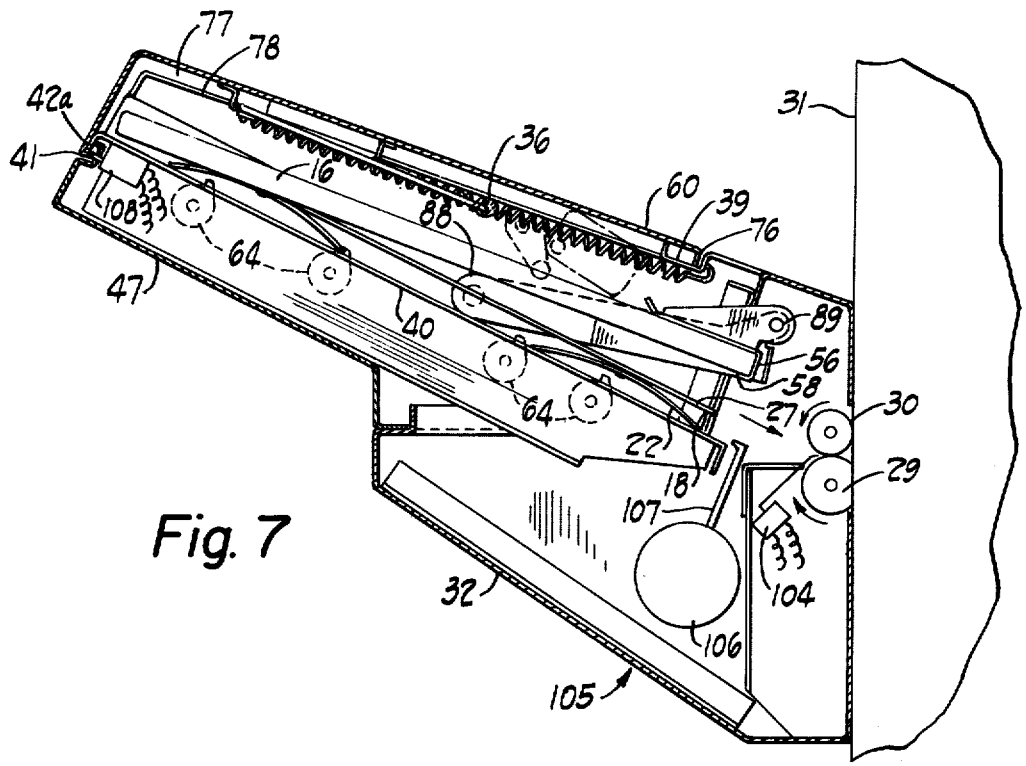

When the hold-down assembly reaches the position shown in FIG. 7, the forward or right-hand edge, as viewed in FIG. 7 of the cassette has been elevated but the trailing, or left-hand edge is still in abutment with the cassette supporting tray 40. This abutment produces one of the outstanding features of the invention. The elevation of the forward edge of the cassette allows its back plate or cover 18 to swing about the pintle axes of the hinges 19, 20. The confinement of the hinged end of the cassette cover 18 between the cassette supporting tray 40 and the still lowered rearward portion of the cassette 15 causes the hinged end of the cover 18 to pinch the trailing edge of the film 27. Thus, as the cover 18 initially swings open, this pinching of the film prevents movement of the film 27 toward the feed rolls 29, 30.

The film initially drops with the cover 18. This dropping permits the forward end of the film to clear the frame 16 of the cassette and the end engaging lip 58 of the hold-down assembly 48. Subsequent elevation of the trailing edge of the cassette, in a manner to be described, releases the film allowing it to be gravity fed to the feed rolls 29, 30. To assure clearance of the cassette frame 16 by the film, an insert 86 is provided, FIG. 1. The insert extends transversely across the forward end of the cassette. The insert has a smooth tapering 86A which extends past and overlies a groove 16A in the frame 16.

As an examination of FIG. 4 will show, the follower arm 88 extends essentially from the follower pivot 85 to the connecting pivot 90. The control arm 87 on the other hand, has an extending cam portion 95 which projects rearwardly away from the processor, to the left as seen in FIG. 5, from the control pivot 82. This extending cam portion 95 actuates a cassette trailing edge control arm 97. The trailing edge control arm 97 is pivotally connected at 98 to the side flange 44. A cam pin 99 projects outwardly, downwardly as viewed in FIG. 4, from the trailing edge control arm 97. The cam pin 99 is engaged by the cam arm portion 95. Counterclockwise rotation, as viewed in FIG. 3, of the control arm 87 causes, through coaction of the cam arm and pin 95, 99, counterclockwise rotation of the trailing edge control arm 97 about its pivot 98.

Cassette trailing edge lift pin 100 projects through an arcuate slot 101 in the side flange 44, FIG. 3. This cassette lift pin 100 is spaced further from the pivot 98 than is the cam pin 99. This permits the cassette control arm 97 to be gravity biased to maintain the cam pin 99 in engagement with the cam portion 95 at all times. It also provides a linkage in which there is considerable lost motion before the cassette trailing edge lift pin 100 engages the cassette 15.

Because of the lost motion, initial rotation of the control arm 87 causes the forward edge of the cassette to be lifted to the position of FIG. 7 while the trailing edge is not lifted. Continued rotation of the control arm further lifts the forward edge of the cassette and also causes the cassette lift pin 100 to lift the trailing edge of the cassette. This releases the pinch on the film 27 permitting it to be gravity fed out of the cassette and into the feed rolls 29, 30.

CYCLE COMPLETION

Figure 6:
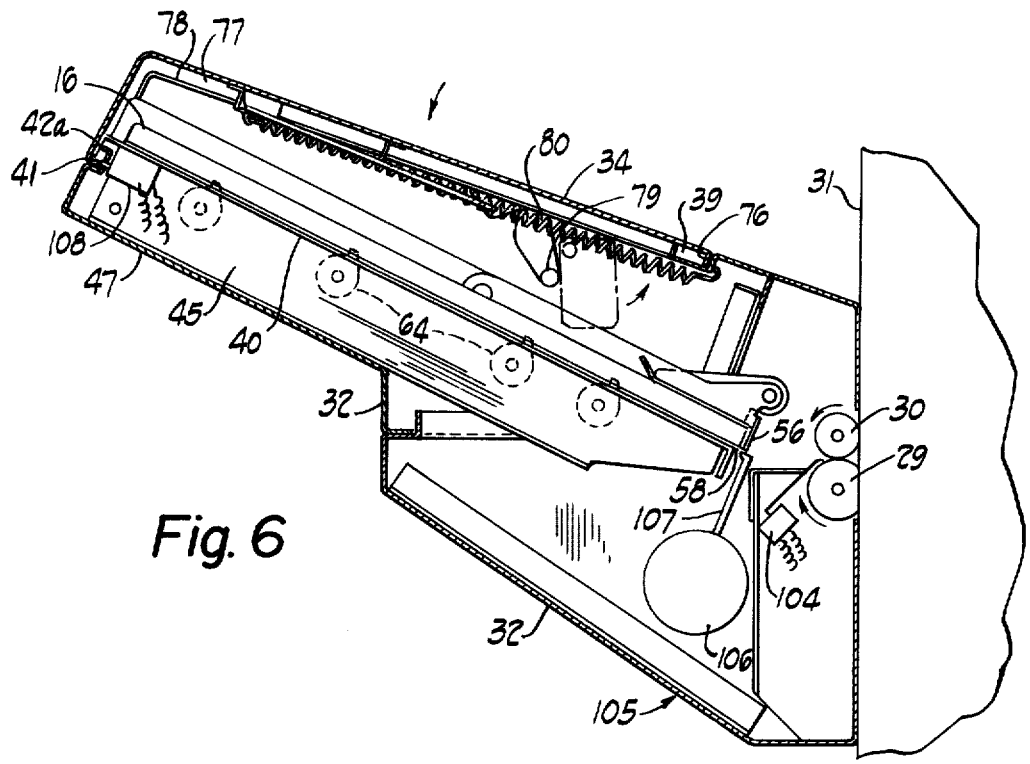

A film sensing limit switch 104 is positioned to sense a film being fed through the feed rolls. The film limit switch 104 is best seen in FIGS. 3, 6, and 7. When the film limit switch is actuated by a film, a suitable lock can be energized to maintain the cover in a locked condition. More important, when the film 27 ceases to actuate the film limit switch 104, a signal is emitted to advise the operator that the film has been released from the cassette and fed into the processor. This is a signal for the operator to open the door 34 by pulling it rearwardly to release the lip 41 and then elevating the cover 34. As soon as the cover commences to elevate, the spring 38 acting against the support rod 35 will move the cover to its fully-elevated position of FIG. 3.

Since the cassette hold-down assembly 48 has been elevated, the cassette is still in an elevated condition and is easily removed. Moreover, the hold-down assembly is maintained in the position shown best in FIG. 7 until the cassette has been removed and the hold-down assembly is returned to the position shown in FIG. 3. The hold-down assembly is maintained in the elevated condition by a linkage, not shown, carried by the handle arm 94.

FILM RIFFLING MECHANISM 105

If the ambient atmosphere has low humidity, static electricity can be a problem and the film 27 may adhere to the intensifying screens in the cassette. To overcome this and assure reliable film feed, a film-riffling mechanism 105 is provided. The mechanism 105 includes a small air compressor 106 and an outlet nozzle 107. The nozzle 107 is positioned to blow air on the film and riffle it and assure its coming free from the cassette. The air compressor 106 is connected to and controlled by a cover-sensing limit switch 108, FIG. 7. The cover limit switch 108 is shown positioned such that its sensing arm projects through the cover locking flange 42a. When so positioned, the cover-sensing limit switch is actuated when the cover is fully closed. Actuation of the cover limit switch 108 energizes air compressor 106.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. A daylight cassette unloader comprising:
   a. a housing including a load opening and means to render the load opening light tight;
   b. said housing defining a light-tight enclosure at times when cassettes are opened therein;
   c. cassette retainer release means within the housing and adapted to release cassette retainers upon insertion of a cassette into the housing and thereafter to maintain the cassette in a closed condition.

d. cassette opening means at least partially within the housing and adapted to open a cassette and release a film retained therein after operation of the retainer release means and subsequent to the load opening being rendered light tight by the rendering means; and, e. said opening means being adapted to permit a back plate of the cassette to swing open and the lead edge of a sheet of film to drop while a portion near the trailing edge is pinched to retain it in the cassette and thereafter to release the pinch on the trailing portion.

2. The unloader of claim 1 wherein the cassette opening means includes a lost-motion connection.

3. A daylight cassette unloader comprising:

a. a housing including a load opening and means to close the load opening;

b. said housing defining a light-tight enclosure at times when the load opening is closed;

c. an L-shaped cassette holding and opening structure within the housing and including a side leg paralleling the path of insertion of a cassette into said structure, and an end leg paralleling the leading edge of the cassette, said legs extending substantially perpendicular to each other within the plane of movement of a cassette during insertion into the housing;

d. a manually actuatable structure control mechanism connected to the structure and carried by the housing; and, e. said end leg being adapted to engage the leading edge of the cassette and said side leg being adapted to engage a side portion of the cassette so as to position the leading edge and the side portion of the cassette in a preselected position while enabling the unloader to accept cassettes of a wide range of sizes.

4. The unloader of claim 3 wherein each leg is a channel which engages the top, bottom and side surfaces of an engaged cassette.

5. In combination with a film processor having feed rolls, a daylight cassette unloader comprising:

a. a housing and frame structure carried by the processor and adapted to guide film to feed rolls;

b. said structure including an access opening and a movable cover for selectively closing the opening;

c. the structure including a cassette support within the housing;

d. a cassette manipulating assembly including hold-down mechanism mounted above the tray and adapted to receive and hold an inserted cassette;

e. cassette retainer release means connected to the structure and positioned to engage cassette retainers as a cassette is inserted into the hold-down mechanism and unlock the retainers;

f. the assembly also including mechanism actuating means carried by the structure and connected to the hold-down;

g. the actuating means being adapted to elevate the hold-down mechanism and release a film from a cassette;

h. disabling means carried by the structure and adapted to render the assembly inoperable to open a cassette; and, i. enabling means carried by the structure and adapted to move the disabling means and render the actuating means operative when the cover is closed.

6. The combination of claim 5 wherein the disabling means comprises a link interposed between the structure and the assembly and prevents movement of the hold-down away from the cassette support when the assembly is rendered inoperative.

7. The combination of claim 6 wherein the link is pivotally connected to a selected one of the structure and the assembly and engages the other when the assembly is rendered inoperative.

8. The combination of claim 5 wherein the enabling means is carried by the cover.

9. The combination of claim 5 wherein the enabling means is a pin adapted to engage and move the disabling means.

10. In combination with a film processor having feed rolls, a daylight cassette unloader comprising:

a. a housing and frame structure carried by the processor and adapted to guide film to the feed rolls;

b. said structure including an access opening and a cover for selectively closing the opening;

c. the structure including a cassette support tray within the housing;

d. a cassette hold-down mechanism mounted above the tray and adapted to receive and hold an inserted cassette;

e. retainer release means carried by the structure and positioned to engage cassette retainers as a cassette is inserted into the hold-down mechanism;

f. a manually actuatable linkage carried by the structure and including a handle external of the structure;

g. said linkage being connected to the hold-down and including hold-down control means to elevate initially a forward edge of the hold-down while a trailing edge of the hold-down is maintained in its lowered condition, the hold-down control means being further adapted to thereafter raise the trailing edge and release a film from a cassette;

h. disabling means carried by the structure and adapted to render the linkage inoperable to elevate the hold-down mechanism; and, i. enabling means carried by the structure and adapted to move the disabling means and render the linkage operative when the cover is closed.

11. The device of claim 10 wherein the enabling means is connected to the cover to move the disabling means when the cover is closed.

12. In combination with a film processor including feed rolls, a daylight cassette unloader comprising:

a. a housing and frame carried by the processor and adapted to guide film to feed rolls;

b. said housing and frame including an access opening and a movable cover for selectively closing the opening;

c. the housing and frame including a cassette support tray within the housing;

d. a cassette hold-down mechanism mounted above the tray and adapted to receive and hold an inserted cassette;

e. retainer release means carried by the housing and frame and positioned to engage cassette retainers as a cassette is inserted into the hold-down mechanism;

f. a manually actuatable linkage carried by the housing and frame and including a handle external of the housing and frame; and, g. said linkage being connected to the hold-down and including a lost motion portion to elevate initially a forward edge of the hold-down while a trailing edge of the hold-down is maintained in its lowered condition, the hold-down control means being further adapted to thereafter raise the trailing edge and release a film from a cassette whereby it will be gravity fed to the feed rolls.

13. A daylight cassette unloader comprising:

a. a housing including a load opening and means to render the load opening light tight;

b. said housing defining a light-tight enclosure at times when cassettes are opened therein;

c. a cassette manipulating means at least partially disposed within the housing and including means to manipulate an end portion of a cassette remote from its hinges to open the cassette face plate while simultaneously pinching a film in a location near the hinges whereby to free a leading edge of such film from the cassette; and, d. the manipulating means being adapted to release such film pinch after the leading edge of the film is free of the cassette.

14. The unloader of claim 13 wherein the opening of the cassette face plate is accomplished by lowering the face plate edge remote from the hinges relative to the remainder of the cassette and wherein the leading edge of the film is freed by gravity.

15. The unloader of claim 13 wherein the manipulating means is positioned to allow a sheet of film to be gravity fed from an open cassette upon release of such film pinch.

16. The unloader of claim 15 wherein the manipulating assembly includes a hold-down engaging at least forward and side edge portions of a cassette and a lost-motion linkage for elevating first the leading and thereafter the trailing edge of the cassette.

* * * * *